United States Patent [19]
Evans

[11] 3,947,042

[45] Mar. 30, 1976

[54] RECORD PLAYERS

[75] Inventor: Philip Henry Evans, Stourbridge, England

[73] Assignee: Glenburn Engineering (U.K.) Limited, England

[22] Filed: June 21, 1974

[21] Appl. No.: 481,541

[30] Foreign Application Priority Data
June 29, 1973 United Kingdom............... 30974/73

[52] U.S. Cl. ................................. 274/9 A; 274/1 E
[51] Int. Cl.² ................. G11B 15/29; G11B 15/44
[58] Field of Search ............ 274/9 R, 9 A, 1 R, 1 E, 274/39 A

[56] References Cited
UNITED STATES PATENTS

| | | | |
|---|---|---|---|
| 2,611,038 | 9/1952 | Graham | 274/9 A |
| 3,008,720 | 11/1961 | Aoki | 274/9 A |
| 3,065,972 | 11/1962 | Aoki | 274/9 A |

FOREIGN PATENTS OR APPLICATIONS

| | | | |
|---|---|---|---|
| 624,309 | 1961 | Italy | 274/39 A |

Primary Examiner—Richard E. Aegerter
Assistant Examiner—A. J. Mirabito
Attorney, Agent, or Firm—Klarquist, Sparkman, Campbell, Leigh, Hall & Whinston

[57] ABSTRACT

A record player including a turntable driven by a motor through a jockey pulley interposed between the turntable rim and a spindle driven by the motor in which the spindle is stepped to provide a number of portions of different diameter and the portions themselves being slightly tapered so that adjustment of the pulley axially of each portion permits a fine adjustment of the speed of rotation of the turntable, and in which the jockey pulley is mounted on a speed change arm which can be moved to move the jockey pulley axially of the spindle by a cam means driven by a manually operable drive element, and wherein a manually operable pitch adjusting member is also provided for rotation about the same axis as the manually operable drive element to cause axial movement of the cam means relative to the drive element and hence of the jockey pulley relative to the spindle to permit fine adjustment of the speed of rotation of the turntable.

10 Claims, 3 Drawing Figures

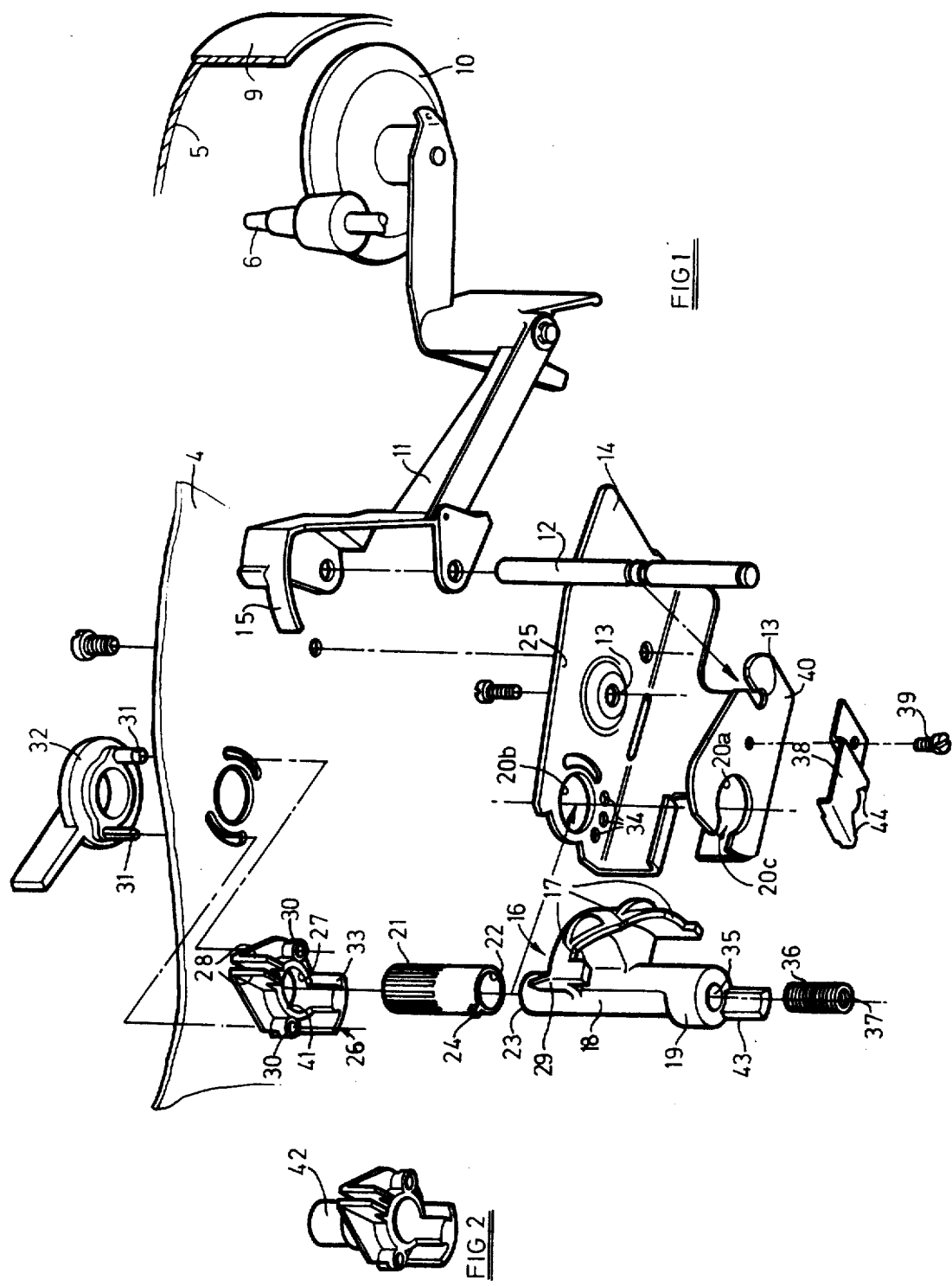

RECORD PLAYERS

BACKGROUND OF THE INVENTION

Field of the invention

This invention relates to a record player of the type hereinafter referred to as the type described, including a speed change mechanism comprising a turntable driven by a motor through a jockey pulley drivingly interposed between a member drivingly associated with the turntable and a spindle driven by the motor, the spindle being stepped to provide a plurality of portions of different diameter and said portions being slightly tapered whereby adjustment of the pulley axially of each portion permits a fine adjustment of the speed of rotation of the turntable.

Usually the member drivingly associated with the turntable is a downwardly depending rim portion formed integrally with the remainder of the turntable.

SUMMARY OF THE INVENTION

An object of the present invention is to provide a new or improved record player of the type described.

According to one aspect of the present invention we provide a record player of the type described comprising a speed change arm, on which the jockey pulley is rotatably mounted, pivotally and slidably mounted on the record player, cam means rotatably mounted on the record player and engaged by a part associated with the speed change arm to cause, when rotated, movement of the arm to engage the jockey pulley with a desired one of the stepped portions of the spindle, a manually operable drive element mounted on the record player for rotation about said axis, coupling means to couple the drive element to the cam means to transmit rotary movement of the drive element to the cam means and to permit relative axial movement between the drive element and the cam means, and a manually operable pitch adjusting member also mounted for rotation about said axis to cause axial movement of the cam means relative to the drive element.

According to another aspect of the present invention we provide a record player of the type described comprising a speed change arm, on which the jockey pulley is rotatably mounted, pivotally and slidably mounted on the record player, cam means rotatably mounted on the record player and engaged by a part associated with the speed change arm to cause, when rotated, movement of the arm to engage the jockey pulley with a desired one of the stepped portions of the spindle, a manually engageable member mounted on the record player for rotation about the axis of rotation of the cam means, a drive element also mounted for rotation about said axis, first coupling means to couple the manually engageable member to the drive element to permit rotation of the manually engageable member to be transmitted to the drive element and second coupling means to couple the drive element to the cam means to permit rotary movement of the drive element to be transmitted to the cam means.

The second coupling means may permit relative axial movement between the cam means and the drive element and a manually operable pitch adjusting member may be mounted for rotation relative to the drive element about said axis to cause axial movement of the cam means relative to the drive element to cause axial movement of the speed change arm and hence the jockey pulley to achieve said fine adjustment of the speed of rotation of the turntable.

The second coupling means may comprise a radially projecting and axially extending tongue portion provided on the cam means or drive element engaged between two spaced radially projecting and axially extending socket portions provided on the drive element or cam means respectively.

The first coupling means may comprise inter-engageable peg and socket means provided between the manually engageable member and the drive element.

The manually operable pitch adjustment member may be rotatably mounted within the drive element and there being cam means provided between the drive element and pitch adjusting member to cause axial movement of the pitch adjusting member.

The cam means may comprise a part helical surface provided on one end surface of the drive element and engaged by a cam follower portion associated with the pitch adjustment member. Biasing means may be provided to bias the cam means into engagement with the pitch adjustment member whereby axial movement of the pitch adjusting member is communicated to the cam means.

According to another aspect of the invention we provide a record player embodying the invention as set out herein modified by the omission of said pitch adjustment member and wherein the drive element has formed integrally therewith or fixedly secured thereto a portion which, externally of the record player, simulates the manually engageable pitch adjustment member whereby the same embellishment parts may be used with a record player not provided with a pitch adjustment means as are provided on a record player embodying diameters as described heretofore and incorporating a pitch adjustment member.

BRIEF DESCRIPTION OF THE DRAWINGS

The invention will now be described in more detail by way of example with reference to the accompanying drawings wherein:-

FIG. 1 is an exploded perspective view of a speed change mechanism for use in a record player embodying the present invention;

FIG. 2 is a perspective view of a modified drive element for use in a second embodiment of the invention.

DESCRIPTION OF THE PREFERRED EMBODIMENT

Figure 3:
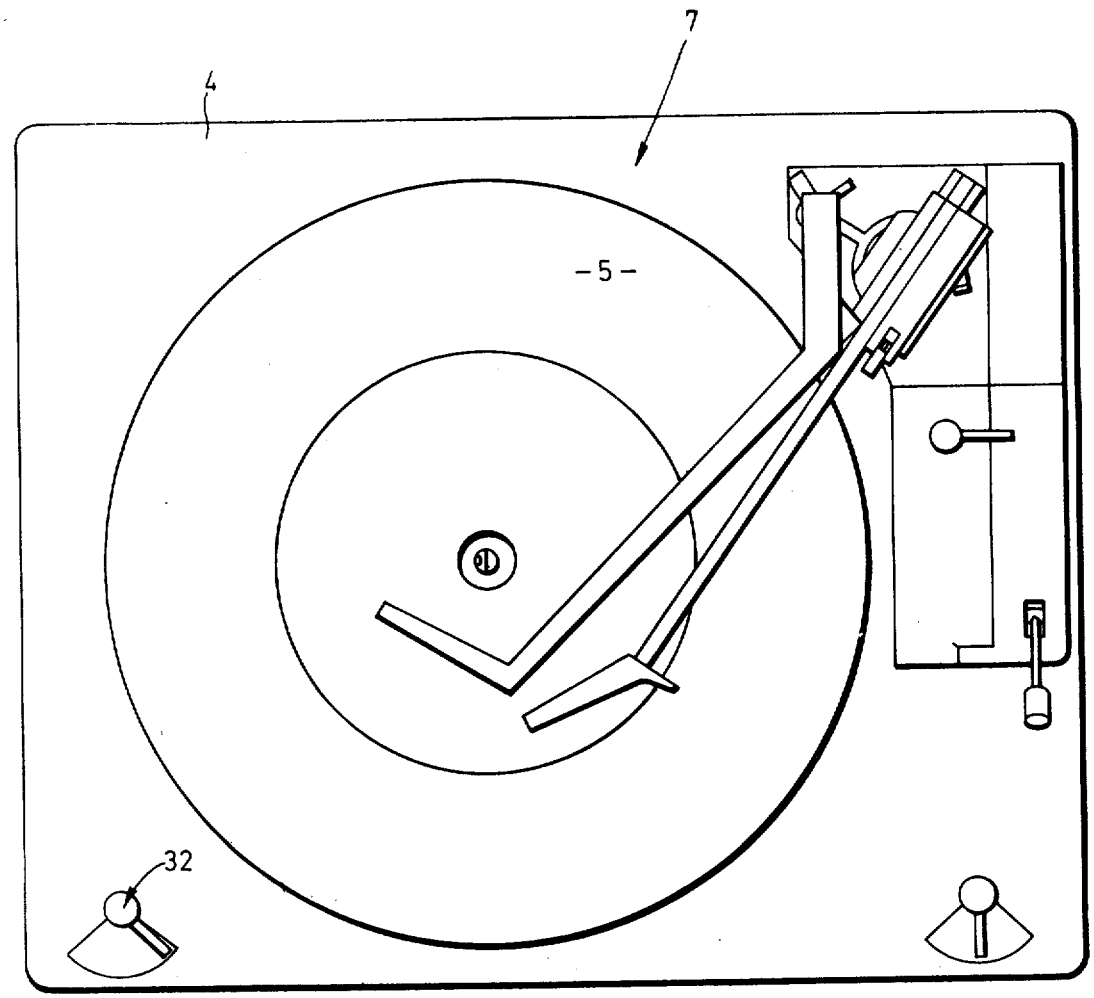
FIG. 3 is a plan view of a record player embodying the mecanism of FIG. 1.

Referring now to FIGS. 1 and 3 of the drawings, there is illustrated a speed change mechanism for use in a conventional record player 7 in which a jockey pulley, indicated generally at 10 is interposed between a downwardly depending rim 9 formed integrally with the turntable 5 of the record player 7 and a stepped spindle 6, which has a number, for example, three portions of different diameter and in which each portion of different diameter is tapered so that axial movement of the jockey pulley 10 relatively to the spindle 6 between the portions of different diameter provides a speed change facility for the record player to permit records having varying playing speeds for example 33 r.p.m., 45 r.p.m., and 78 r.p.m. to be played whilst the tapering of each stepped portion permits a fine adjustment of the speed of rotation as a result of adjustment of the jockey pulley 10 longitudinally along each stepped portion.

The jockey pulley 10 is rotatably carried at one end of a speed change arm 11 which is rotatably and slidably mounted on the record player by means of a pivot pin 12 carried in apertures 13 in a support bracket 14 fixed to the deck plate 4 of the record player 7. The speed change arm 11 has a cam follower portion 15 for engagement with a raising cam 16 having three cam surfaces 17 in conventional manner to cause axial movement of the jockey pulley 10 longitudinally of the spindle and to lift the jockey pulley radially out of engagement with the spindle during change from one speed to another. The raising cam has a boss portion 18 having an enlarged head 19 at one end and the boss portion 18 is received in apertures 20 formed in the support bracket 14. The boss portion 18 is arranged so that the head 19 is received within the lower aperture 20a and is rotatably mounted thereby whilst the upper end of the boss portion 18 is a clearance fit in the upper aperture 20b. A manually operable pitch adjustment knob 21 having a generally cylindrical external surface and a stepped cylindrical bore is arranged to be rotatably mounted within the upper aperture 20b and the larger diameter internal bore 22 thereof is adapted to provide a mounting for the upper end of the boss part 18 of the cam means 16. The upper, smaller bore, not shown, in the knob 21 is screw threaded and a screw having a rounded end is engaged therewith in interference fit with the screw thread to restrain the screw from rotation in use, and provides a bearing and stop for engagement with the upper end 23 of the boss part 18. A cam follower part 24 projects radially outwardly from the lower end of the knob 21. Engaged around the lower part of the knob 21 beneath the upper limb 25 of the support bracket 14 is a drive element 26 provided with a central bore 27 dimensioned so as to provide a mounting for the drive element on the knob 21.

The drive element 26 has a pair of spaced apart parallel socket portions 28 between which is engaged a radially projecting tongue part 29 moulded integrally with the remainder of the raising cam means 16. The portions 28 and 29 provide a coupling between the drive element 26 and the cam means 16 hereinafter referred to as a second coupling means.

Drive element 26 is provided with a pair of diametrically opposite split sockets 30 which receive tapered pins 31 extending downwardly from a manually engageable control member 32. One pair of sockets and pins is of larger dimensions than the other so that the pins and sockets can only be engaged when the control member is in a predetermined orientation relative to the drive element. The drive element is provided with a downwardly depending socket part 33 which is provided with an axially extending bore open at its upper end within which is received a spherical ball, not shown. The ball is urged into engagement with one or other of the three apertures 34 provided in the upper limb 25 of the support bracket 14 around the aperture 26b therein by a coil compression spring, not shown, housed within the bore in the pocket part 33 beneath the ball. The ball and apertures serve as a detent means to locate the manually operable control member in any one of three desired angular positions.

The hereinbefore mentioned pins and sockets 31 and 30 constitute a coupling means which will be referred to herein as a first coupling means.

The lower end of the boss portion 18 of the cam means 16 is provided with a blind bore 35 within which is engaged a coil compression spring 36 having an end portion 37 adapted to engage a bracket 38 fixed by a screw 39 to the lower limb 40 of the support bracket 14. The spring 36 urges the cam 16 upwardly so that the upper surface 23 thereof is held in engagement with the hereinbefore mentioned rounded end of the screw engaged within the pitch adjustment knob 21. The lower end of the boss portion 18 is provided with a projection 43 which engages stops 44 placed on the bracket 38 to limit movement of the speed change means.

The speed change means described hereinbefore can be assembled by first engaging the drive element 26 around the pitch knob 21 and then feeding the upper end of the pitch knob upwardly through the aperture 20b. The cam 16 is then fed into the bracket assembly by feeding the upper end of the boss portion 18 into the passage 22 in the lower end of the pitch knob and simultaneously passing the lower part of the boss portion 18 above the head 19 through the neck 20c of the aperture 20a. The spring 36 is then positioned within the blind bore 35 and the bracket 38 secured to the lower limb 40 of the support bracket 14. Finally the manually engageable control member is engaged with the drive element by passing it downwardly over the upper end of the pitch adjusted knob 21 until the tongues 31 engage within their respective sockets 30 the split nature of the sockets providing a clamping action to hold the pitch adjustment knob in position. During the assembly of the cam means into the bracket the tongue part 29 is engaged between the socket portions 28.

The upper end surface, not shown, of the pitch adjustment knob 21 is provided with an embellishment which incorporates a radially outwardly pointing arrow whilst the upper surface of the control member 32 is provided with an annular embellishment provided with a scale of graduations to indicate the change in speed of rotation resulting from rotation of the pitch control knob 21.

Because the pitch control means, including the pitch adjustment knob 21 is mounted with and carried by the drive element 26 the abovementioned scale and arrow are moved together when the speed is changed as a result of rotation of the control member 32 and hence for each of the three available speeds of the record player the pitch control indexing means is available to a user.

In use, when it is desired to change the speed of the record player the manually engageable control member 32 is grasped and rotated and the first coupling means constituted by the pins 31 and sockets 30 communicate the rotary motion to the drive element 26 and the second coupling means constituted by the tongue 29 and socket portions 28 communicate the rotary movement from the drive element to the cam means. The cam surfaces 17 engage with the cam follower portion 15 and move the speed change arm 11 pivotally and axially in conventional manner to change the speed of the record player.

When it is desired to provide a fine adjustment of any of the three speeds the pitch adjustment knob 21 is rotated so that the cam follower portion 24 thereof engages a helical surface 41 provided on the underside of the drive element 26 thereby causing axial movement of the knob 21 which causes axial movement of the cam 16 due to the engagement between the upper surface 23 thereof and the screw engaged within the smaller diameter screw theaded bore of the knob 21.

If it is desired to produce a record player not provided with any facility for fine speed adjustment then the manufacturer can readily modify the speed change mechanism described hereinbefore merely by substituting for the separate drive element 26 and pitch adjustment knob 21 a different drive element, illustrated in FIG. 2 which is identical to the drive element 26 described hereinbefore except that the helical surface 41 is omitted and instead of a passage 27 for the pitch knob 21 there is moulded integrally with the drive element an upwardly extending cylindrical portion 42 which simulates the appearance of the switch control knob and thus permits any embellishment provided on the upper surface of the control member 32 or pitch adjustment knob 21 to be utilised in this version of the record player. In all other respects the record player and method of assembly of the speed change means are as described in connection with FIG. 1.

I claim:

1. A record player including a turntable, a motor, a member drivingly associated with the turntable, a spindle driven by the motor, a jockey pulley drivingly interposed between said spindle and member, said spindle being stepped to provide a plurality of portions of different diameter and said portions being slightly tapered whereby adjustment of the pulley axially of each portion permits a fine adjustment of the speed of rotation of the turntable speed change arm, on which said jockey pulley is rotatably mounted, means pivotally and slidably mounting said arm on said record player, cam means rotatably mounted on said record player and engaged by a part associated with said speed change arm to cause, when rotated, movement of said arm to engage said jockey pulley with a desired one of said stepped portions of said spindle, a manually operable drive element mounted on said record player for rotation co-axially of the cam means, coupling means to couple said drive element to said cam means to transmit rotary movement of said drive element to said cam means and to permit relative axial movement between said drive element and said cam means, and a manually operable pitch adjusting member also mounted for rotation co-axially of the cam means to cause axial movement of said cam means relative to said drive element to cause axial movement of said speed change arm and hence said jockey pulley to achieve said fine adjustment of the speed of rotation of the turntable.

2. A record player according to claim 1 wherein said manually operable pitch adjustment member is rotatably mounted within said drive element and there being cam means provided between said drive element and said pitch adjusting member to cause axial movement of said pitch adjusting member.

3. A record player according to claim 2 wherein said cam means comprises a part helical surface provided on one end surface of said drive element and engaged by cam follower portion associated with said pitch adjustment member.

4. A record player according to claim 3 wherein a biasing means is provided to bias said cam means into engagement with said pitch adjusting member whereby axial movement of said pitch adjusting member is communicated to said cam means.

5. A record player including a turntable, a motor, a member drivingly associated with the turn-table, a spindle driven by the motor, a jockey pulley drivingly interposed between said spindle and member, said spindle being stepped to provide a plurality of portions of different diameter and said portions being slightly tapered whereby adjustment of the pulley axially of each portion permits a fine adjustment of the speed of rotation of the turntable, a speed change arm, on which said jockey pulley is rotatably mounted, means pivotally and slidably mounting said arm on said record player, cam means rotatably mounted on said record player and engaged by a part associated with said speed change arm to cause, when rotated, movement of said arm to engage said jockey pulley with a desired one of said stepped portions of said spindle, a manually engageable member mounted on said record player for rotation co-axially of said cam means, a drive element also mounted for rotation co-axially of the cam means, first coupling means to couple said manually engageable member to said drive element to permit rotation of said manually engageable member to be transmitted to said drive element and second coupling means to couple said drive element to said cam means to permit rotary movement of said drive element to be transmitted to said cam means, wherein said second coupling means permits relative axial movement between said cam means and said drive element and a manually operable pitch adjusting member is mounted for rotation relative to said drive element co-axially of the cam means to cause axial movement of said cam means relative to said drive element to cause axial movement of said speed change arm and hence said jockey pulley to achieve said fine adjustment of the speed of rotation of the turntable.

6. A record player according to claim 5 wherein said second coupling means comprises a radially projecting and axially extending tongue portion provided on said cam means or drive element engaged between two spaced radially projecting and axially extending socket portions provided on said drive element or cam means respectively.

7. A record player according to claim 5 wherein said first coupling means comprises interengageable peg and socket means provided between said manually engageable member and said drive element.

8. A record player according to claim 5 wherein said manually operable pitch adjusting member is rotatably mounted within said drive element and there being cam means provided between said drive element and said pitch adjusting member to cause axial movement of said pitch adjusting member.

9. A record player according to claim 8 wherein said cam means comprises a part helical surface provided on one end surface of said drive element and engaged by a cam follower portion associated with said pitch adjusting member.

10. A record player according to claim 9 wherein a biasing means is provided to bias said cam means into engagement with said pitch adjusting member whereby axial movement of said pitch adjusting member is communicated to said cam means.

* * * * *